(12) United States Patent
Serizawa et al.

(10) Patent No.: US 6,390,228 B2
(45) Date of Patent: May 21, 2002

(54) HYDRAULIC POWER STEERING APPARATUS FOR VEHICLE

(75) Inventors: Akihiko Serizawa; Masaru Ishiwata, both of Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/793,287

(22) Filed: Feb. 26, 2001

(30) Foreign Application Priority Data

Apr. 25, 2000 (JP) ........................................ 2000-124784

(51) Int. Cl.⁷ ............................. B62D 5/00; E03B 31/00
(52) U.S. Cl. ....................... 180/403; 180/414; 180/417; 180/419; 180/422; 180/423; 180/441; 180/6.2; 180/6.26; 180/6.44; 137/625.23
(58) Field of Search ................................ 180/6.2, 6.26, 180/6.44, 403, 414, 417, 419, 422, 423, 441; 137/625.23

(56) References Cited

U.S. PATENT DOCUMENTS

| | | | | |
|---|---|---|---|---|
| 4,445,422 A | * | 5/1984 | Bishop | 137/625.24 |
| 4,570,736 A | | 2/1986 | Waldorf | |
| 4,759,420 A | * | 7/1988 | Schipper et al. | 137/625.24 |
| 4,799,514 A | * | 1/1989 | Tanaka et al. | 137/625.23 |
| 5,046,574 A | * | 9/1991 | Goodrich et al. | 180/423 |
| 5,207,239 A | * | 5/1993 | Schwitalla | 137/870 |
| 5,267,588 A | * | 12/1993 | Bishop et al. | 137/625.23 |
| 5,307,895 A | * | 5/1994 | Duffy | 180/417 |
| 5,519,614 A | | 5/1996 | Yoshinori et al. | |
| 5,538,095 A | | 7/1996 | Kyosuke | |
| 5,593,133 A | | 1/1997 | Hunnicutt | |
| 5,762,157 A | * | 6/1998 | Uehara | 180/197 |
| 5,791,433 A | * | 8/1998 | Murakami et al. | 180/417 |
| 6,125,970 A | * | 10/2000 | Takeuchi et al. | 187/223 |
| 6,173,223 B1 | * | 1/2001 | Liubakka et al. | 180/422 |
| 6,260,641 B1 | * | 7/2001 | Hidaka | 180/6.44 |

FOREIGN PATENT DOCUMENTS

| | | | | |
|---|---|---|---|---|
| JP | 127247 | * | 10/1980 | ................. 180/423 |
| JP | 71466 | * | 3/1988 | |
| JP | HEI 6-79895 | | 10/1994 | |
| JP | 263251 | * | 10/1997 | ................. 180/423 |

* cited by examiner

*Primary Examiner*—Lanna Mai
*Assistant Examiner*—Toan C To
(74) *Attorney, Agent, or Firm*—Orum & Roth

(57) ABSTRACT

A hydraulic power steering apparatus for a vehicle is provided with a main control valve in which a valve opening degree is controlled on the basis of a relative movement between an input shaft interlocking with a steering wheel and an output shaft interlocking with a steering mechanism for turning a steered wheel, a power cylinder mechanism generating a steering assist force, a pump apparatus discharging a fixed flow amount of working oil, a first flow passage including a supply passage communicated with the main control valve, and a control unit controlling an assist control valve. The main control valve controls a supply amount of the working oil in the first flow passage to the power steering apparatus, and the assist control valve controlling a flow amount of a part of the working oil discharged from the pump apparatus is controlled to a set valve opening degree set on the basis of a vehicle speed and an oil pressure of the working oil in the first flow passage, by the control unit.

2 Claims, 6 Drawing Sheets

HYDRAULIC POWER STEERING APPARATUS FOR VEHICLE

BACKGROUND OF THE INVENTION

1. Field of the Invention

The present invention relates to a hydraulic power steering apparatus for a vehicle, and more particularly to a pressure and vehicle speed sensitive type hydraulic power steering apparatus which controls steering assist force in response to an external load (a road reaction force) correlated with fluid pressure of working fluid supplied to a power cylinder mechanism and vehicle speed.

2. Description of the Related Art

Relating to a hydraulic power steering apparatus of this kind, for example, there has been known a power steering apparatus disclosed in Japanese Patent Application Publication (JP-B) No. 6-79895. The power steering apparatus is provided with a pump for pressure feeding an oil, a hydraulic motor connected to a tire wheel via a linkage and having a piston and a cylinder, and a rotary valve apparatus for controlling flow of the oil to the hydraulic motor. An output passage of the pump is communicated with an inlet side of a vehicle speed sensing valve, and an outlet side of the speed sensing valve is communicated with a low speed oil inlet passage and a high speed oil inlet passage. Further, the rotary valve apparatus has an internal valve member integrally formed with a steering shaft and a valve sleeve rotatably receiving the internal valve member and integrally rotating with a pinion. The steering shaft and the pinion are connected to each other via a torsion rod displacing in a torsional manner, and first and second valve apparatuses are constituted by the internal valve member and the valve sleeve. In this case, the first valve apparatus increases the magnitude of pressure distributed to the hydraulic motor in correspondence to an increase of the torsional displacement, and the second valve apparatus controls a returning amount of the oil to a suction side of the pump in correspondence to the torsional displacement. Then, the speed sensing valve distributes the oil only to the first valve apparatus when the vehicle is at a low speed, and distributes the oil to both of the first and second valve apparatuses when the vehicle is at a high speed, whereby it is possible to obtain a proper assist force in correspondence to the speed of the vehicle and the torsional displacement.

Since there is no returning amount of the oil during low speed operation, the assist force is increased and operation of a steering handle becomes light. Since a predetermined amount of oil is returned to the suction side of the pump via the second valve apparatus during high speed operation, an amount of oil distributed to the hydraulic motor is reduced by the degree of the returning amount, the assist force is reduced, and the operation of the steering handle becomes heavy.

In this case, although the assist force (the steering assist force) with respect to the displacement is different, a characteristic of the assist force with respect to the torsional displacement is definitely determined in accordance with a geometrical shape of measuring edges of the first and second valve apparatuses, at every vehicle speed. However, since the characteristic of the assist force obtained by the same geometrical shape is not always optimum in all the vehicle speeds, it is desirable to increase freedom for setting the assist force in correspondence to the change of the vehicle speed in such a manner that the assist force can be set with every change of the torsional displacement at every vehicle speed.

SUMMARY OF THE INVENTION

The present invention relates to the matter mentioned above. An object of the present invention is to provide a hydraulic power steering apparatus for a vehicle which recognizes an external load, that is, a road reaction force by a fluid pressure of a working fluid supplied to a power cylinder mechanism, whereby freedom for setting a steering assist force in correspondence to vehicle speed is great.

In accordance with the present invention, there is provided a hydraulic power steering apparatus for a vehicle comprising, an input member interlocking with a steering wheel, and
an output member connected to the input member so as to freely move relatively.

A steering mechanism steering a steered wheel is in an interlocking relationship with the output member.

A main control valve has a first valve portion and a second valve portion in which a valve opening degree is controlled on the basis of relative movement between the input member and the output member.

A power cylinder mechanism generating a steering assist force applied to the steering mechanism is in correspondence to a fluid pressure in a working chamber in which a working fluid is supplied and discharged.

A first flow passage communicates a pump apparatus for discharging a fixed flow amount of working fluid with the main control valve.

A second flow passage is branched from the first flow passage and communicates with a low pressure portion via an assist control valve and the main control valve.

A control unit controls the assist control valve.

The first valve portion controls a supply amount of the working fluid in the first flow passage to the working chamber, and the second valve portion controls a discharge amount of the working fluid in the second flow passage to the low pressure portion in accordance with cooperation with the assist control valve.

A vehicle speed sensor for detecting a vehicle speed and a pressure sensor for detecting a fluid pressure of the working fluid in the first flow passage are provided. The control unit controls a valve opening degree of the assist control valve to a set valve opening degree set on the basis of the vehicle speed detected by the vehicle speed sensor and the fluid pressure detected by the pressure sensor.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

A description will be given below of an embodiment in accordance with the present invention with reference to FIGS. 1 to 9.

Figure 1:
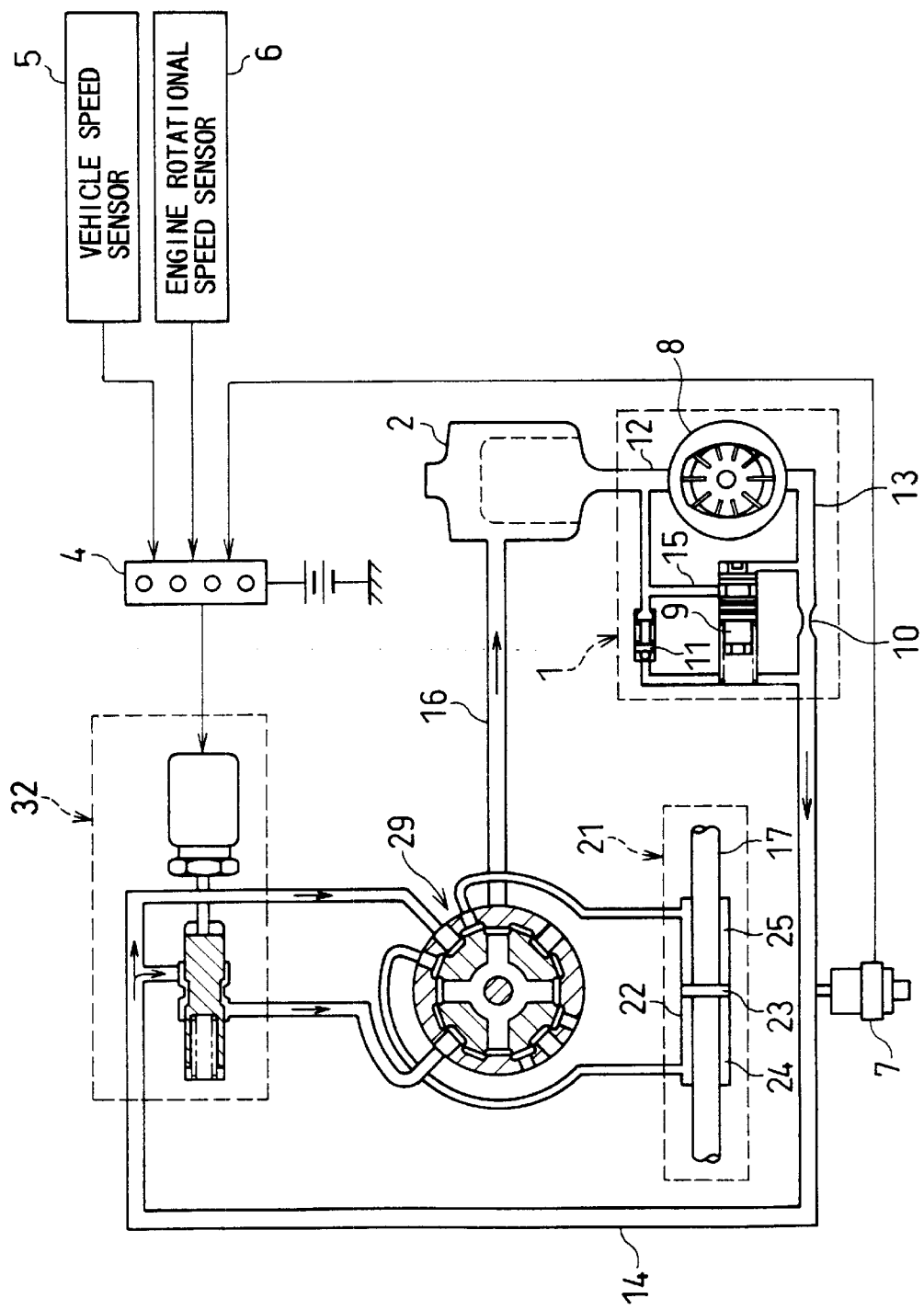
FIG. 1 is an idiomatic diagram mainly showing an oil passage of a hydraulic power steering apparatus for a vehicle corresponding to an embodiment in accordance with the present invention.

FIG. 1 is an idiomatic diagram mainly showing an oil passage of a hydraulic power steering apparatus for a vehicle corresponding to an embodiment in accordance with the present invention. The power steering apparatus is provided with a pump apparatus 1 driven by an internal combustion engine mounted on a vehicle, a reservoir 2, a gear box 3 (refer to FIG. 2), an electronic control unit 4, a vehicle speed sensor 5, an engine rotational speed sensor 6 and a pressure sensor 7.

The pump apparatus 1 supplying a working oil corresponding to a working fluid to the gear box 3 is provided with a vane-type hydraulic pump 8, a flow amount control valve 9, a fixed orifice 10 and a relief valve 11. The hydraulic pump 8 driven by a crank shaft of the internal combustion engine sucks the working oil stored in the reservoir 2 via a suction passage 12 and discharges the working oil which has developed a high pressure to a discharge passage 13. The discharge passage 13 is communicated with a supply passage 14 for supplying the working oil to a main control valve 29 mentioned below provided in the gear box 3 via the fixed orifice 10, and is communicated with the suction passage 12 via a return passage 15 in which the flow amount control valve 9 is provided. Then, the flow amount control valve 9 moving in response to a differential pressure between the discharge passage 13 and the supply passage 14 adjusts a flow amount returning to the suction passage 12 via the return passage 15 in cooperation with the fixed orifice 10. A flow amount of the working oil discharging to the supply passage 14 becomes fixed in a rotational number range equal to or more than a predetermined rotational number of the hydraulic pump 8 corresponding to an idling rotational number of the internal combustion engine. Further, the supply passage 14 and the suction passage 12 are communicated with each other via the relief valve 11, and the relief valve 11 is opened when the oil pressure in the supply passage 14 becomes a value over a set allowable maximum value so as to keep the oil pressure in the supply passage 14 in a level equal to or less than the allowable maximum value.

The reservoir 2 is communicated with the main control valve 29 of the gear box 3 via a circulating passage 16 so as to temporarily store the working oil discharged from the main control valve 29. The stored working oil is supplied to the hydraulic pump 8 via the suction passage 12.

Figure 2:
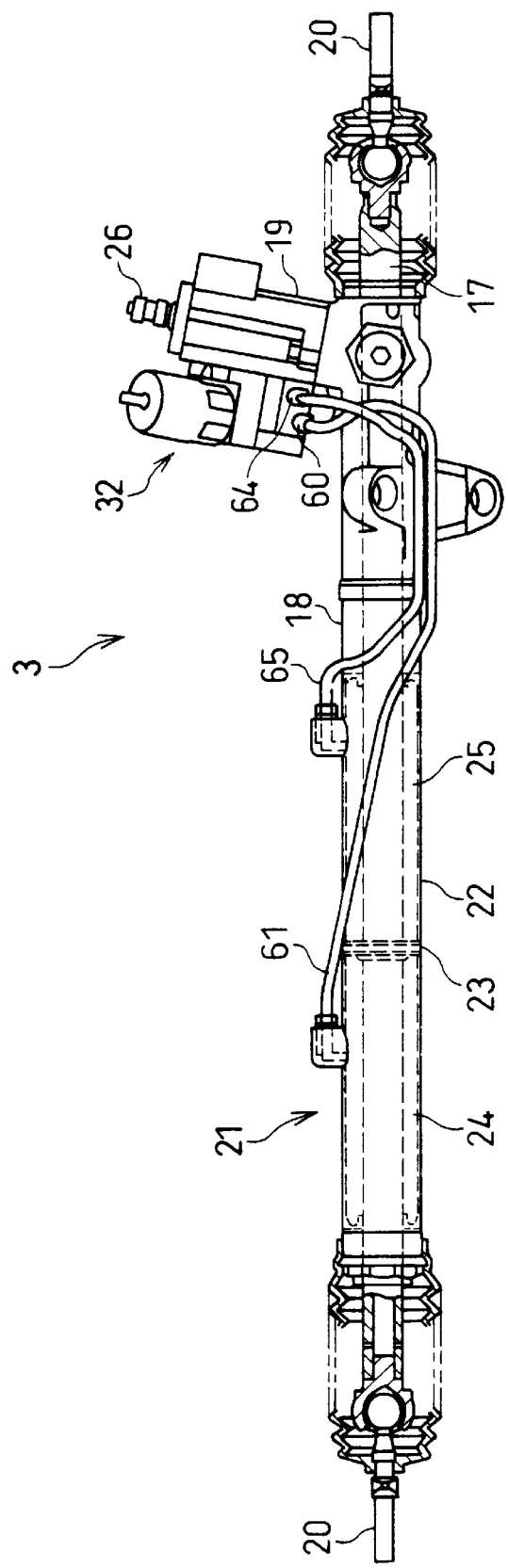
FIG. 2 is a partly cross sectional view of a whole of a gear box.

The gear box 3 is, as illustrated in FIG. 2, provided with a cylindrical housing 18 for receiving a rack shaft 17 in such a manner as to freely move in an axial direction thereof (also corresponding to a lateral direction in this embodiment), and a valve housing 19 connected to one end portion of the housing 18. One end portion of each of a pair of tie rods 20 and 20 is connected to each of both end portions of the rack shaft 17 via a pair of ball joints, and another end portion of each of the tie rods 20 and 20 is connected to the steered wheel via a connecting mechanism (not shown). In this case, the rack shaft 17, the tie rods 20 and 20 and the connecting mechanism constitute a steering mechanism.

A power cylinder mechanism 21 setting a part of the housing 18 to a power cylinder 21 is provided in a middle portion of the housing 18. The power cylinder mechanism 21 is provided with the power cylinder 21, a power piston 23 adhered to the rack shaft 17 so as to be fitted within the power cylinder 21 in such a manner as to freely swing in the axial direction, and a left oil chamber 24 and a right oil chamber 25 corresponding to a pair of working chambers respectively formed in both side portions of the power piston 23.

Figure 3:
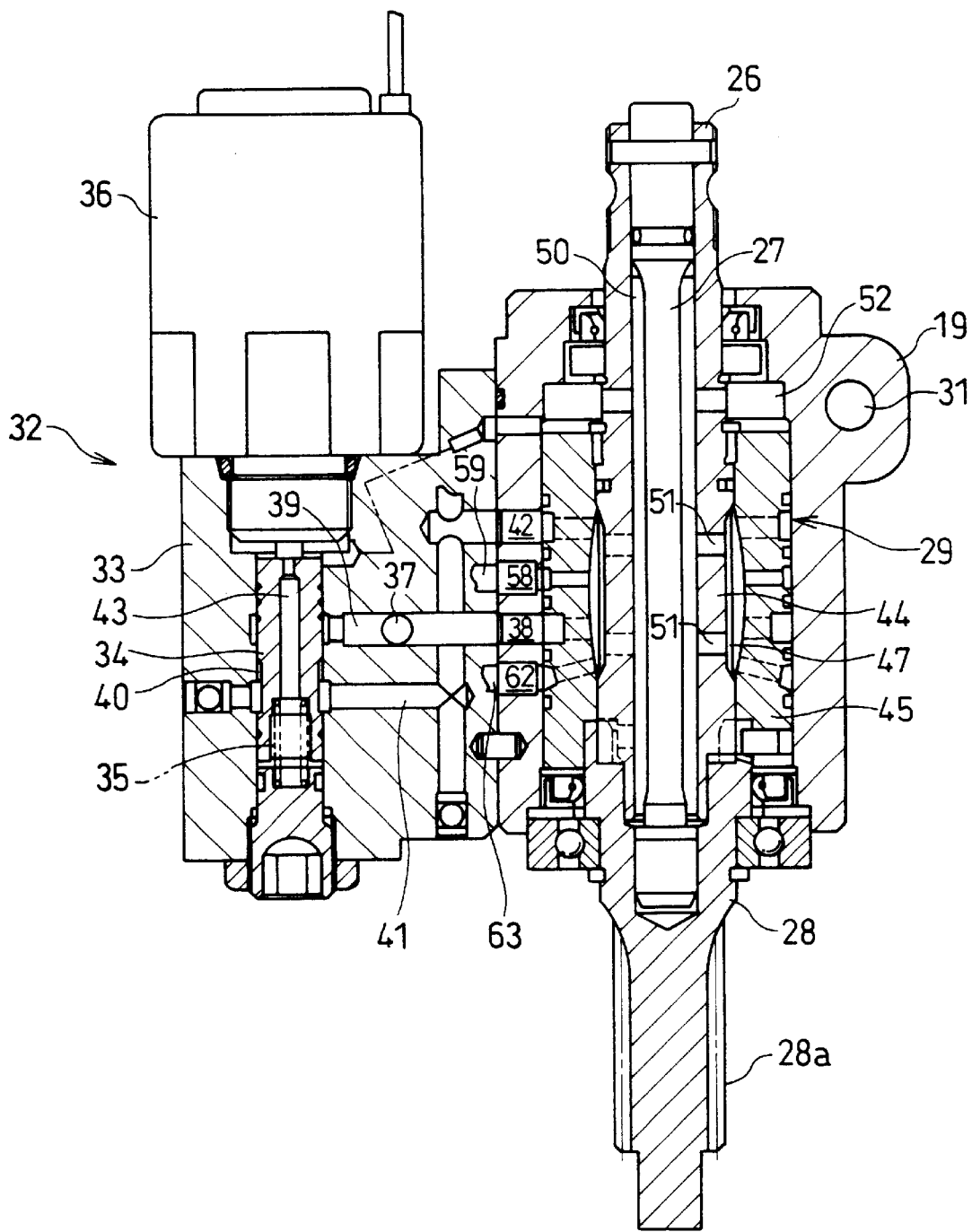
FIG. 3 is a cross sectional view of a main control valve and an assist control valve.

An input shaft 26 corresponding to an input member connected to a steering wheel (not shown) in an interlocking manner, and an output shaft 28 connected to the input shaft 26 via a torsion bar 27 are rotatably received in the valve housing 19, respectively, as shown in FIG. 3. Accordingly, the input shaft 26 and the output shaft 28 are structured such as to be capable of relatively moving in a rotational direction within a torsional range of the torsion bar 27. A pinion 28a engaged with rack teeth formed in the rack shaft 17 is formed in a lower end portion of the output shaft 28 within the housing 18.

Further, a main control valve 29 constituted by a rotary valve for controlling supply and discharge of the working oil with respect to the left oil chamber 24 and the right oil chamber 25 is disposed in the valve housing 19. An oil supply port (not shown) communicated with the supply passage 14 and an oil discharge port 31 communicated with the circulating passage 16 which are communicated with the main control valve 29, are respectively provided.

An assist control valve 32 constituted by a linear solenoid valve is mounted to a side surface of the valve housing 19. The assist control valve 32 is provided with a valve body 33 fastened to the valve housing 19 by a bolt, a spool 34 swingably fitted within the valve body 33, a return spring 35, and a solenoid 36 driving the spool 34 in an axial direction against the return spring 35. An oil passage 37 communicated with the oil supply port is formed in the valve body 33. The oil passage 37 is communicated with a connecting port 38 of the valve housing 19 in the main control valve 29, and an oil passage 39 branched from the oil passage 37 is open to a position communicated with and shut from a ring-like control groove 40 provided on an outer peripheral surface of the spool 34. An oil passage 41 is provided having one end always communicated with the control groove 40 and another end communicated with the connecting port 42 of the valve housing 19. The oil passage 39 and the control groove 40 are in a non-communicative state when the vehicle speed is equal to or less than a predetermined low vehicle speed, and are in a communication state when the spool 34 is moved by the solenoid 36 and the vehicle speed becomes greater than the predetermined low vehicle speed. The result of this structure is that a communication area between both elements is increased in correspondence to an increase of the vehicle speed. In this case, a space in which the return spring 35 is received is communicated with a center hole 50 mentioned below via an oil passage 43 provided in the spool 34 and the valve body 33. In this case, each of axes of the main control valve 29 and the assist control valve 32 is in a torsional positional relation as illustrated in FIG. 2, and a cross section in FIG. 3 shows a cross section passing through each of the axes.

The main control valve 29 is provided with a rotary valve body 44 integrally formed with the input shaft 26, and a sleeve 45 within which the rotary valve body 44 is fitted in such a manner as to freely swing in a rotational direction. The sleeve 45 is connected to the output shaft 28 so as to integrally rotate therewith, and is fitted within the valve housing 19 in such a manner as to freely swing in the rotational direction. Accordingly, the rotational valve body 44 constitutes an input side valve element interlocking with the input shaft 26, and the sleeve 45 constitutes an output side valve element interlocking with the output shaft 28.

Figure 4:
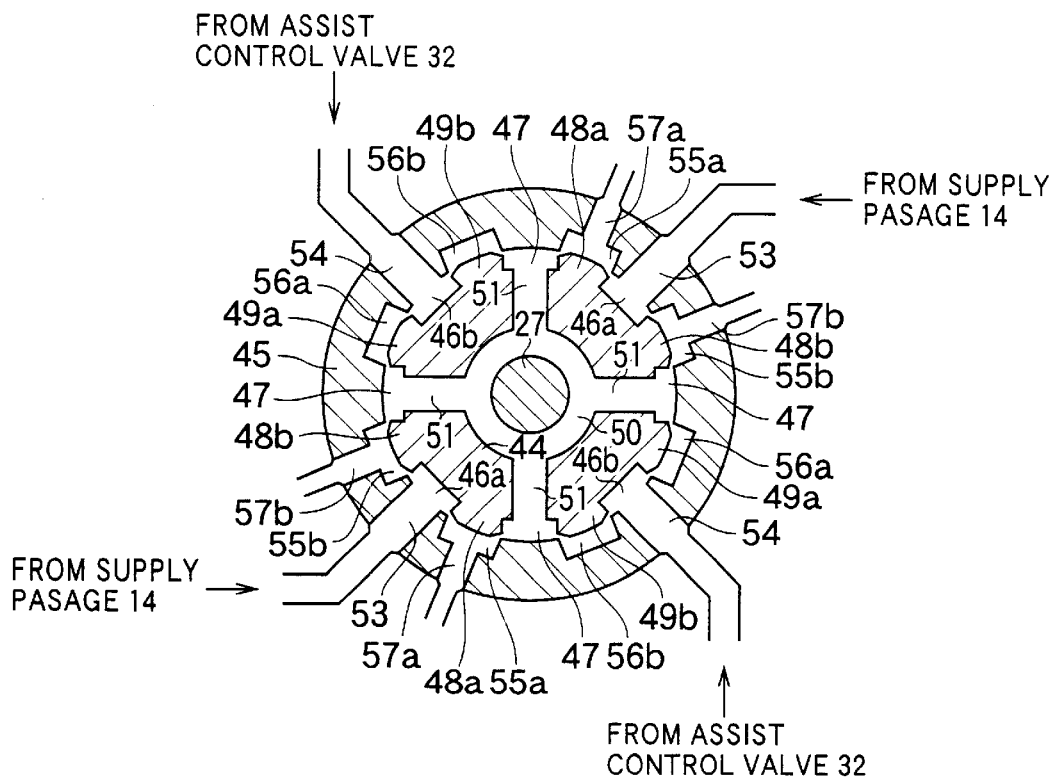
FIG. 4 is a cross sectional view on a plane vertically crossing in an axial direction of the main control valve, which explains a valve structure of the main control valve.

Referring to FIG. 4 in combination, four inflow grooves 46a, 46a, 46b and 46b and four return grooves 47, 47, 47 and 47 which extend in an axial direction are alternately provided on an outer peripheral surface of the rotary valve body 44 at a uniform interval in a peripheral direction. Two first lands 48a and 48b and two second lands 49a and 49b which are positioned between the adjacent return grooves 47 and 47 are alternately provided in a peripheral direction. The first lands 48a, 48a, 48b and 48b are constituted by a pair of left first lands 48a and 48a opposing each other in a diametrical direction and a pair of right first lands 48b and 48b opposing each other in a diametrical direction. The second lands 49a, 49a, 49b and 49b are constituted by a pair of left second lands 49a and 49a opposing each other in a diametrical direction and a pair of right second lands 49b and 49b opposing each other in a diametrical direction. The inflow grooves 46a, 46a, 46b and 46b are constituted by two first inflow grooves 46a and 46a and two second inflow grooves 46b and 46b. Each of the first inflow grooves 46a and 46a is positioned between the left and right first lands 48a and 48b, and each of the second inflow grooves 46b and 46b is positioned between the left and right second lands 49a and 49b. Each of the return grooves 47, 47, 47 and 47 is communicated with a center hole 50 provided along the rotary axis of the rotary valve body 44 via oil passages 51, 51, 51 and 51. The center hole 50 is communicated with the oil discharge port 31 via an oil passage 52 provided in the valve housing 19.

Two first inflow passages 53 and 53 communicated with the supply passage 14 via the connecting port 38 and the oil passage 37 and two second inflow passages 54 and 54 communicated with the connecting port 42 and the oil passage 41 are respectively provided at positions opposing to both of the first inflow grooves 46a and 46a and positions opposing to both of the second inflow grooves 46b and 46b Relative positions of the rotary valve body 44 and the sleeve 45 are in a state that no relative movement exists between the input shaft 26 and the output shaft 28, that is, a neutral position of the main control valve 29, on an inner peripheral surface of the sleeve 45. In the neutral position, a pair of left first control grooves 55a and 55a and a pair of right first control grooves 55b and 55b are respectively provided in such a manner as to oppose a pair of left first lands 48a and 48a, and to oppose a pair of right first lands 48b and 48b. A pair of left second control grooves 56a and 56a and a pair of right second control grooves 56b and 56b are respectively provided in such a manner as to oppose a pair of left second lands 49a and 49a, and to oppose a pair of right second lands 49b and 49b.

Each of the left first control grooves 55a and 55a is communicated with a left supply and discharge port 60 provided in the valve body 33 via left first supply and discharge passages 57a and 57a in the sleeve 45. A connecting port 58 in the valve housing 19 and an oil passage 59 in the valve body 33, and the left supply and discharge port 60 is communicated with the left oil chamber 24 via a left oil passage 61. In the same manner, each of the right first control grooves 55b and 55b is communicated with a right supply and discharge port 64 provided in the valve body 33 via right first supply and discharge passages 57b and 57b in the sleeve 45. A connecting port 62 in the valve housing 19 and an oil passage 63 in the valve body 33, and the right supply and discharge port 64 is communicated with the right oil chamber 25 via a right oil passage 65.

The supply passage 14, the oil supply port, the oil passage 37, the connecting port 38 and the first inflow passages 53 and 53 constitute a first flow passage, and the oil passage 39, the oil passage 41, the connecting port 42, the second inflow passages 54 and 54, the oil passage 51, the center hole 50, the oil passage 52, the oil discharge port 31 and the circulating passage 16 constitute a second flow passage. Then, the reservoir 2 to which the working oil is returned via the circulating passage 16 constitutes a low pressure portion.

Figure 5:
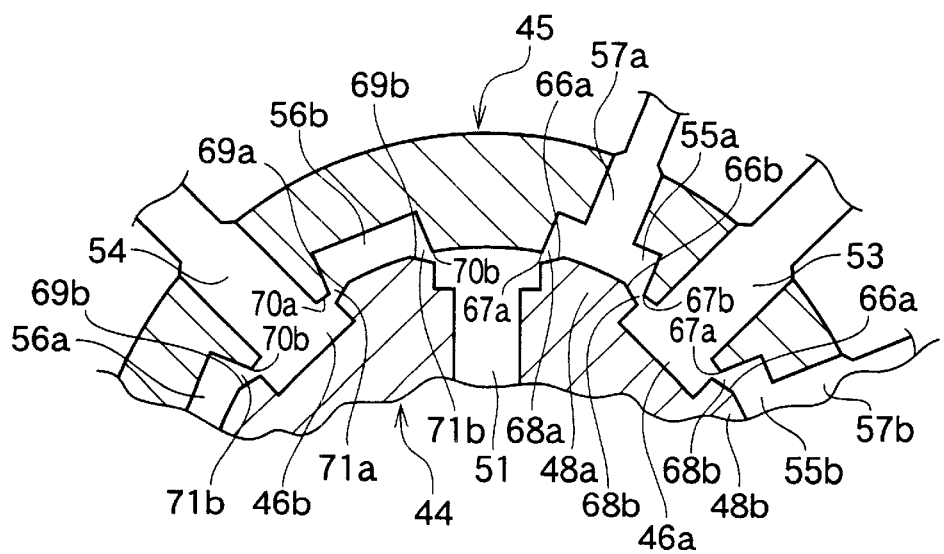
FIG. 5 is a partly enlarged view of FIG. 4.

As is well illustrated in FIG. 5, both corner portions in a peripheral direction of each of the first lands 48a, 48a, 48b and 48b respectively have two beveled first control portions 66a and 66b. Two left and right first throttle portions 68a and 68b are respectively formed in accordance with cooperation of both of the first control portions 66a and 66b and both edges 67a and 67b in the peripheral direction of each of the first control grooves 55a, 55a, 55b and 55b. Accordingly, a first valve portion is constituted by the first lands 48a, 48a, 48b and 48b and the first control grooves 55a, 55a, 55b and 55b. A magnitude of an opening area of the first throttle portions 68a and 68b is determined in accordance with a valve opening degree of the first valve body.

Figure 6:
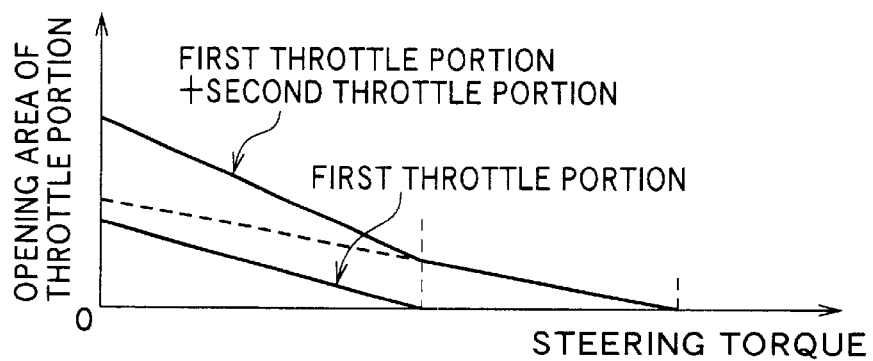
FIG. 6 is a graph showing a relation between a steering torque and an opening area of a throttle portion.

As shown in FIG. 6, each of the first control portions 66a and 66b is formed so as to have such a geometrical shape that when the rotary valve body 44 rotates leftward from the neutral position, the opening area of each of the left first throttle portions 68a becomes small in correspondence to an increase of a leftward rotational displacement and becomes zero at a predetermined rotational position. The opening area of each of the right first throttle portions 68b becomes large in correspondence to an increase of a leftward rotational displacement. When the rotary valve body 44 rotates rightward from the neutral position, the opening area of each of the right first throttle portions 68b becomes small in correspondence to an increase of a rightward rotational displacement and becomes zero at a predetermined rotational position. The opening area of each of the left first throttle portions 68a becomes large in correspondence to an increase of a rightward rotational displacement.

Further, both corner portions in the peripheral direction of each of the second lands 49a, 49a, 49b and 49b respectively have two second control portions 69a and 69b formed in a beveling manner and extending in the peripheral direction longer than the first control portions 66a and 66b. Two left and right second throttle portions 71a and 71b are respectively formed in accordance with cooperation of both of the second control portions 69a and 69b and both edges 70a and 70b in the peripheral direction of each of the second control grooves 56a, 56a, 56b and 56b. A second valve portion is constituted by the second lands 49a, 49a, 49b and 49b and the second control grooves 56a, 56a, 56b and 56b, and a magnitude of an opening area of the second throttle portions 71a and 71b is determined in accordance with a valve opening degree of the second valve body.

As shown in FIG. 6, each of the second control portions 69a and 69b is formed so as to have such a geometrical shape that when the rotary valve body 44 rotates leftward from the neutral position, the opening area of each of the left second throttle portions 71a becomes small in correspondence to an increase of a leftward rotational displacement and becomes zero at a predetermined rotational position. The opening area of each of the rightward second throttle portions 71b becomes large in correspondence to an increase of a leftward rotational displacement. When the rotary valve body 44 rotates rightward from the neutral position, the opening area of each of the right second throttle portions 71b becomes small in correspondence to an increase of a rightward rotational displacement and becomes zero at a predetermined rotational position. The opening area of each of the left second throttle portions 71a becomes large in correspondence to an increase of a rightward rotational displacement.

With respect to the working oil supplied to the first inflow grooves 46a and 46a from the supply passage 14 via the oil passage 37 by the main control valve 29, a flow amount flowing into the return grooves 47, 47, 47 and 47 is controlled by each of the first throttle portions 68a and 68b in the first valve portion, so that a supply amount of the working oil to the left oil chamber 24 and the right oil chamber 25 in the power cylinder mechanism 21 is controlled. With respect to the working oil supplied to the second inflow grooves 46b and 46b from the oil passage 39 via the oil passage 41 by the assist control valve 32, a flow amount flowing into the return grooves 47, 47, 47 and 47 is controlled by the valve opening degree of the assist control valve 32 and each of the second throttle portions 71a and 71b in the second valve body, so that a discharge amount of the working oil to the reservoir 2 is controlled.

A vehicle speed signal output from the vehicle speed sensor 5 for detecting a speed of the vehicle, an engine rotational number signal output from the engine rotational speed sensor 6 for detecting the rotational number of the internal combustion engine, and an oil pressure signal output from the pressure sensor 7 provided in the supply passage 14 and detecting an oil pressure corresponding to a fluid pressure of the working oil in the supply passage 14 are input to the electronic control unit 4 for controlling an operation of the assist control valve 32. Since the oil pressure in the supply passage 14 indicates a value dependent on the valve opening degrees of the first and second valve portions in the main control valve 29 in correspondence to the steering torque, an external load, that is, a road reaction force is reflected together with the steering torque.

The electronic control unit 4 has serial processing means executing processes until outputting a drive signal to the solenoid 36 on the basis of the input signal from each of the sensors. Among these processing means are means for searching a valve opening degree map in which a set valve opening degree of the assist control valve 32 is set by using the vehicle speed and the oil pressure as parameters. The basis of the input vehicle speed signal and oil pressure signal constitutes valve opening degree setting means, and means for outputting a drive signal corresponding to the calculated set valve opening degree, for example, a current having a predetermined duty ratio controlled in a duty manner to the solenoid 36 constitutes valve drive controlling means.

The solenoid 36 continuously moves the spool 34 in an axial direction so as to form a straight line in correspondence to the supplied drive signal, whereby the spool 34 controls the oil passage 39 and the control groove 40 in a communicated state and a shut state. In this case, the engine rotational number corresponds to a control allowing signal which confirms whether or not the internal combustion engine is in an operated state so as to allow the control of the assist control valve 32 or not. When the internal combustion engine is stopped, the assist control valve 32 is in a nonoperating state, and the spool 34 is arranged at a position where the oil passage 39 and the control groove 40 are communicated with each other, due to spring force of the return spring 35.

In the valve opening degree map, in relation to the vehicle speed detected by the vehicle speed sensor 5, the set valve opening degree is set to zero at a time of a vehicle speed equal to or less than the predetermined low vehicle speed including a vehicle stop time. At this time, the solenoid 36 moves the spool 34 against the return spring 35 so as to shut the communication between the oil passage 39 and the control groove 40, and the set valve opening degree is set so that the communicating area between the oil passage 39 and the control groove 40 is increased in accordance that the vehicle speed is increased over the predetermined low vehicle speed. In relation to the oil pressure detected by the pressure sensor 7, the set valve opening degree is set so that the oil pressure for generating the steering assist force having an optimum magnitude is generated in the left oil chamber 24 or the right oil chamber 25 of the power cylinder mechanism 21, with respect to the steering torque generated at a time when the driver operates the steering wheel.

Figure 9:
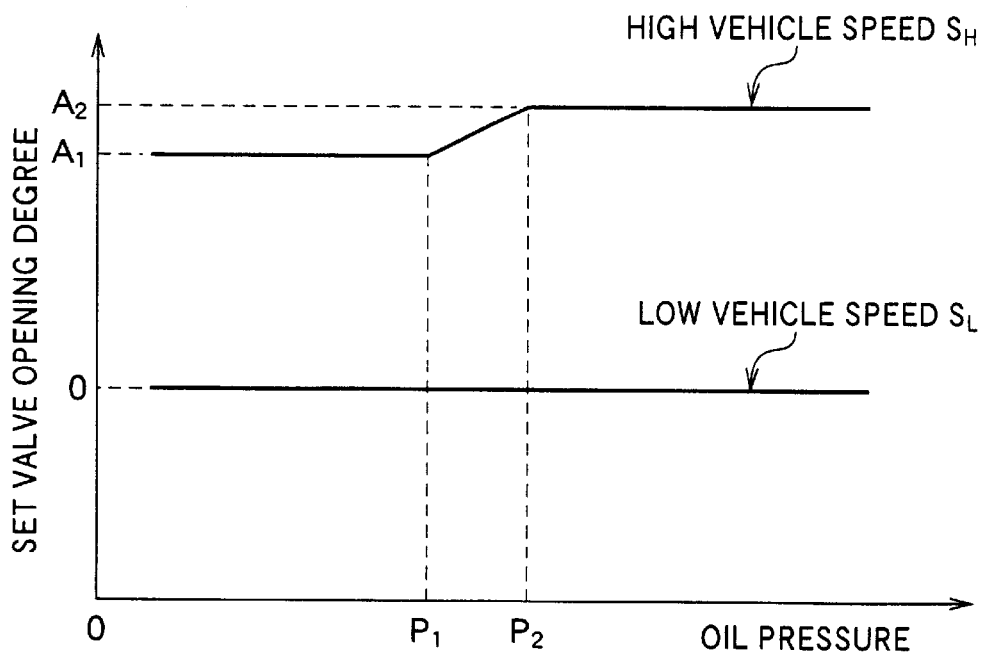
FIG. 9 is a valve opening degree map for setting a set valve opening degree of an assist control valve with respect to an oil pressure detected by a pressure sensor, in a specific vehicle speed.

In this embodiment, as an embodiment of the valve opening degree map, as shown in FIG. 9, at a low vehicle speed $S_L$ equal to or less than the predetermined low vehicle speed, the set valve opening degree of the assist control valve 32 is zero, that is, fully closed without relation to the oil pressure detected by the pressure sensor 7. As an embodiment of the vehicle speed in the vehicle speed range where the vehicle speed becomes larger than the predetermined low vehicle speed and the assist control valve 32 is in an open valve state, at a high vehicle speed $S_H$, when the oil pressure generated due to the steering torque is equal to or more than a first predetermined value $P_1$, the set valve opening degree of the assist control valve 32 is gradually increased from a predetermined value $A_1$ so as to become a second predetermined value $A_2$ when the oil pressure is equal to or more than a second predetermined value $P_2$.

Next, a description will be given of an operation and an effect of the embodiment structure in the manner mentioned above.

When the internal combustion engine is operated and a fixed flow amount of working oil is discharged to the supply passage 14 in an upstream side of the branch portion of the oil passage 39 from the pump apparatus 1, the engine rotational number signal is input to the electronic control unit 4, and the assist control valve 32 is in a state capable of being controlled. The electronic control unit 4 controls the assist control valve 32 to the set valve opening degree set in accordance with the valve opening degree map on the basis of the vehicle speed detected by the vehicle speed sensor 5 and the oil pressure detected by the pressure sensor 7.

Further, when the vehicle speed is the low vehicle speed $S_L$, the set valve opening degree of the assist control valve 32 is set to zero without relation to the magnitude of the oil pressure obtained by reflecting the external load (the road reaction force), as shown in FIG. 9. In this state, the oil passage 39 and the control groove 40 are shut, all amount of the working oil in the supply passage 14 flows into a pair of first inflow grooves 46a and 46a from a pair of first inflow passages 53 and 53, and the working oil is not supplied from the second inflow passages 54 and 54.

When the steering wheel is not operated, the main control valve 29 is at a neutral position, and the working oil flowing into the first inflow grooves 46a and 46a is returned to the return grooves 47, 47, 47 and 47, the oil passages 51, 51, 51 and 51 and the center hole 50 via the throttle portions 68a and 68b of the first valve portion and further to the reservoir 2 through the circulating passage 16. Since both of the left oil chamber 24 and the right oil chamber 25 are in a low oil pressure state and the differential pressure applied to the power piston 23 hardly exists, the steering assist force is not generated.

When the steering wheel is leftward rotated (rightward rotated) (hereinafter, descriptions in parentheses show motions when the steering wheel is rightward rotated), the pinion 28a is engaged with the rack teeth, the rack shaft 17 is rightward rotated (leftward rotated), and the tie rods 20 and 20 are rightward rotated (leftward rotated) integrally together with the rack shaft 17, whereby the left and right tire wheels are turned. In the main control valve 29, the working oil flowing from the supply passage 14 via the first inflow passages 53 and 53, the first inflow grooves 46a and 46a, the left first control grooves 55a and 55a (the right first control grooves 55b and 55b) and the left first supply and discharge passages 57a and 57a (the right first supply and discharge passages 57b and 57b) is supplied to the left oil chamber 24 (the right oil chamber 25) via the left oil passage 61 (the right oil passage 65). The amount of the working oil supplied to the left oil chamber 24 (the right oil chamber 25) at this time is determined by the amount of the working oil which is controlled by the first throttle portions 68a and 68a (the first throttle portions 68b and 68b) of the first valve portion so as to flow into the return grooves 47, 47, 47 and 47.

At the same time, the working oil supplied from the right oil chamber 25 (the left oil chamber 24) passes through the right oil passage 65 (the left oil passage 61) and returns to the reservoir 2 via the right first supply and discharge passages 57b and 57b (the left first supply and discharge passages 57a and 57a) of the main control valve 29, the right first control grooves 55b and 55b (the left first control grooves 55a and 55a), the return grooves 47 and 47 and the center hole 50 and further through the circulating passage 16.

Figure 7:
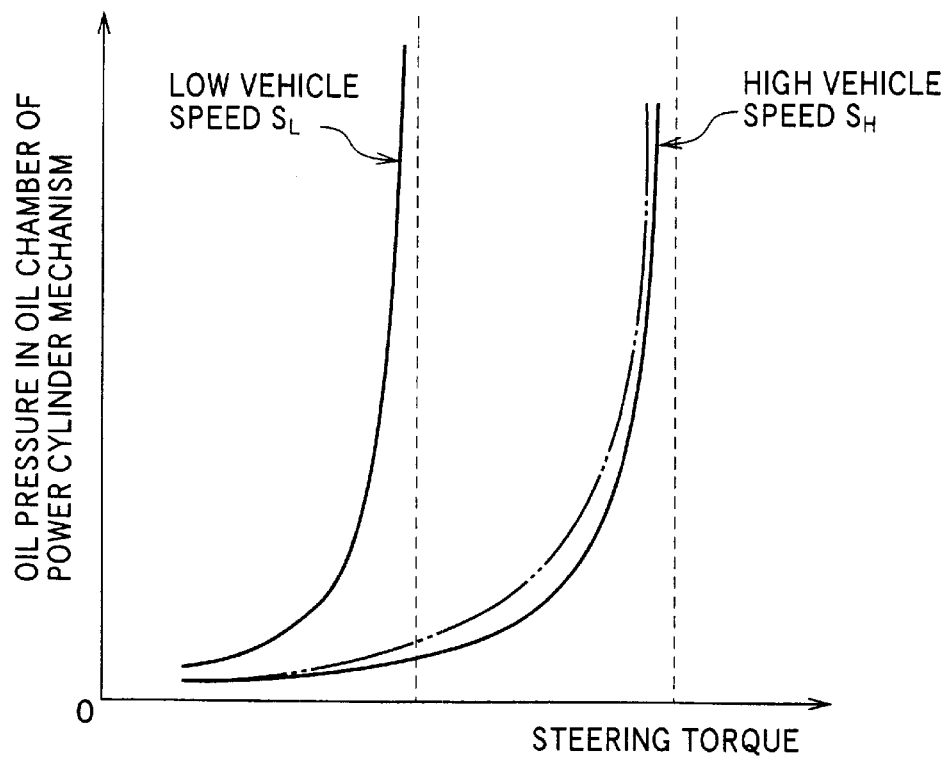
FIG. 7 is a graph showing a relation between a steering torque and oil pressure in an oil chamber of a power cylinder mechanism.

As a result, as shown in FIG. 7, the oil pressure in correspondence to the steering torque is generated in the left oil chamber 24 or the right oil chamber 25 in the power cylinder mechanism 21, and the steering assist force generated on the basis of the differential pressure of both of the oil chambers 24 and 25 is added to the steering mechanism.

When the vehicle speed is increased, for example, to the high vehicle speed $S_H$ mentioned above, the assist control valve 32 is set to the set valve opening degree having a predetermined value $A_1$ when the oil pressure in correspondence to the steering torque is equal to or less than a first predetermined value $P_1$. In this state, a part of the working oil discharged from the pump apparatus 1 flows into the main control valve 29 from the oil passage 39 via the assist control valve 32, and the remaining working oil flows into the main control valve 29 via the oil passage 37 and the connecting port 38.

The working oil supplied from the second inflow passages 54 and 54 is returned to the reservoir 2 via the throttle portions 71a and 71b of the second valve portion after passing through the return grooves 47, 47, 47 and 47, the oil passages 51, 51, 51 and 51 and the center hole 50 and further the circulating passage 16. The amount of the circulating working oil is determined in accordance with the amount of the working oil which is controlled by the second throttle portions 71a, 71a, 71b and 71b of the second valve portion so as to flow into the return grooves 47, 47, 47 and 47 when the steering wheel is not operated, and is determined in accordance with the amount of the working oil which is controlled by the second throttle portions 71a and 71b (the second throttle portions 71b and 71b) of the second valve portion so as to flow into the return grooves 47, 47, 47 and 47 when the steering wheel is leftward rotated (rightward rotated).

Figure 8:
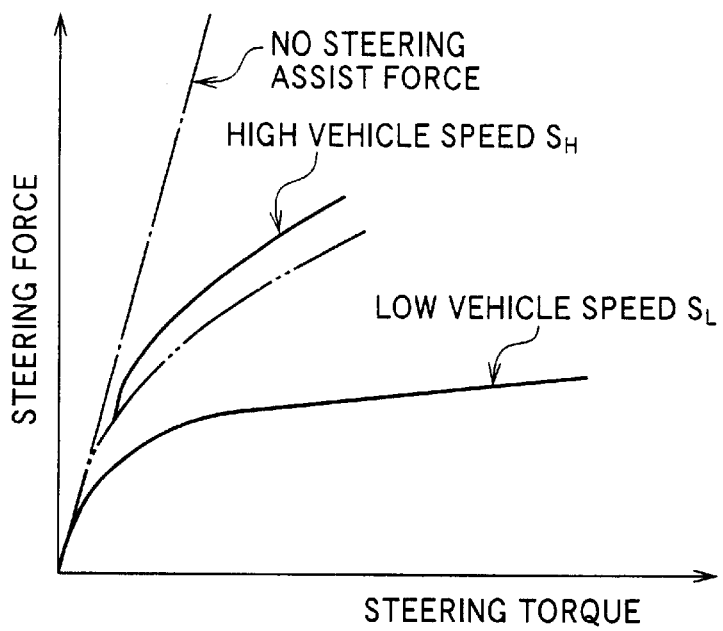
FIG. 8 is a graph showing a relation between a steering torque and a steering force.

On the contrary, the working oil flowing into the first inflow grooves 46a and 46a from the connecting port 38 via the first inflow passages 53 and 53 is controlled by the first throttle portions 68a and 68b in correspondence to the steering torque so as to be supplied to the left oil chamber 24 or the right oil chamber 25 of the power cylinder mechanism 21. At this time, since the amount of the working oil flowing into the first inflow passages 53 and 53 is set to be smaller than that when the assist control valve 32 is closed, in the same manner as that at the low vehicle speed $S_L$ mentioned above, the oil pressure in which the oil pressure in correspondence to the steering torque is generated in the left oil chamber 24 or the right oil chamber 25 of the power cylinder mechanism 21 due to the working oil having the amount of the working oil controlled by the first and second valve portions and supplied to the left oil chamber 24 or the right oil chamber 25, has a small value in the same steering torque in comparison with the low vehicle speed $S_L$ mentioned above, as shown in FIG. 7. The steering assist force generated on the basis of the differential pressure of both of the oil chambers 24 and 25 becomes small, and as shown in FIG. 8, required steering force becomes large in the same steering torque. In this case, steering force when the steering assist force is not generated is shown in FIG. 8 by using a single dot chain line.

When the steering torque becomes greater and the oil pressure detected by the pressure sensor 7 becomes greater than the first predetermined value $P_1$, the set valve opening degree of the assist control valve 32 is made large and becomes the valve opening degree having the predetermined value $A_2$ at the second predetermined value $P_2$ or more. In a range of the steering torque having the oil pressure greater than the first predetermined value $P_1$, in comparison with the case that the set valve opening degree of the assist control valve 32 becomes the predetermined value $A_1$, that is, the oil pressure of both of the oil chambers 24 and 25 is determined only on the basis of the geometrical shape of the control portions 66a, 66b, 69a and 69b of the first and second valve portions, the amount of the working oil supplied to the power cylinder mechanism 21 is reduced. As a result, as shown in FIGS. 7 and 8, in comparison with the characteristic shown by a two-dot chain line when the set valve opening degree of the assist control valve 32 is kept to be the predetermined value $A_1$, in the same steering torque, the oil pressure in both of the oil chambers 24 and 25 becomes smaller, and the steering assist force generated on the basis of the oil pressure becomes smaller, so that the required steering force becomes larger. In the manner mentioned above, a condition that the steering assist force is small is maintained in the range of the large steering torque, whereby it is possible to improve steering stability at the high vehicle speed $S_H$.

In this case, even when the assist control valve 32 is opened, in the case that the steering torque becomes large and the opening area of the throttle portions 71a and 71b in the second valve portion becomes zero, all the amount of the working oil supplied from the pump apparatus 1 is supplied to the first inflow passages 53 and 53, so that a large assist steering force is generated.

As mentioned above, the assist control valve 32 is controlled to the set valve opening degree in correspondence to the vehicle speed and the oil pressure in the supply passage 14 in which the oil pressure obtained by reflecting the external load is generated by the first and second valve portions having the valve opening degree corresponding to the steering torque generated through the relative movement in the rotational direction of the input shaft 26 and the output shaft 28 connected to each other via the torsion bar 27 (that is, the twist of the torsion bar 27). The discharge amount of the working oil in the oil passage 39 branched from the supply passage 14 to the reservoir 2 is controlled by the assist control valve 32, even at the same vehicle speed, with respect to the particular steering torque at that time. The flow amount of the working fluid to the first valve portion after passing through the first inflow passages 53 and 53 from the supply passage 14 is controlled by suitably setting the set valve opening degree of the assist control valve 32 with respect to the oil pressure generated in the supply passage 14 obtained by reflecting the external load. The structure can be made such that the oil pressure for obtaining the steering assist force having an optimum magnitude at the vehicle speed is generated in the left oil chamber 24 and the right oil chamber 25 in the power cylinder mechanism 21.

Since the steering assist force with respect to the steering torque at each of the vehicle speeds can be set to various magnitudes by suitably changing the set valve opening degree of the assist control valve 32 with respect to the oil pressure of the supply passage 14 obtained by reflecting the external load in the steering torque, the freedom for setting the steering assist force with respect to the steering torque becomes great at the vehicle speed, so that it is possible to set the steering assist force to an optimum magnitude at each of the vehicle speeds.

In the main control valve 29, at the first throttle portions 68a and 68b of the first valve portion and the second throttle portions 71a and 71b of the second valve portion which control the supply amount of the working oil to the power cylinder mechanism 21, since the geometrical shape of the first control portions 66a and 66b and the second control portions 69a and 69b may be formed in accordance with working to such a degree that the steering torque is reflected, working at a high accuracy is not required and cost can be reduced.

Since it is possible to set the steering assist force with respect to each of the steering torque by changing the set valve opening degree of the assist control valve 32 with respect to the oil pressure obtained by reflecting the external load in connection with the steering torque, it is possible to easily change the set of the steering assist force with respect to each of the steering torque in correspondence to a kind of vehicle and a driver's taste. Using the main control valve 29 having the same structure, due to a common use of the main control valve 29, and since it is not required to change the first control portions 66a and 66b and the second control portions 69a and 69b corresponding to the portion for controlling the amount of the working oil in the first throttle portions 68a and 68b of the first valve portion and the second throttle portions 71a and 71b of the second valve portion in accordance with the working or the like, it is possible to reduce cost.

In this case, in the embodiment mentioned above, the set valve opening degree is increased within the range of the predetermined steering torque. In some cases, it is possible to reduce the set valve opening degree within a certain steering torque range. Further, at a time of being equal or less than the predetermined low vehicle speed, the set valve opening degree of the assist control valve 32 is set to zero. It is possible to set the set valve opening degree to be more than zero so as to open the assist control valve 32 within the range of the steering torque, for example, that the steering assist force rapidly increases. The pressure sensor 7 is provided in the supply passage 14, however, the pressure sensor 7 may be provided everywhere the first flow passage is constituted, in addition to the supply passage 14.

As heretofore explained, embodiments of the present invention have been described in detail with reference to the drawings. However, the specific configurations of the present invention are not limited to those embodiments but those having a modification of the design within the range of the present invention are also included in the present invention.

In accordance with the present invention, the assist control valve is controlled to the set valve opening degree in correspondence with the vehicle speed and the fluid pressure of the first flow passage in which the fluid pressure obtained by reflecting the external load (the road reaction force) by the first and second valve portions having the valve opening degree in correspondence to the steering torque during the relative movement between the input member and the output member. The discharge amount of the working fluid in the second flow passage to the low pressure portion is controlled by the assist control valve mentioned above. The flow amount of the working fluid supplied from the first flow passage to the first valve portion is controlled by suitably setting the set valve opening degree of the assist control valve with respect to the fluid pressure generated in the first flow passage obtained by reflecting the external load, with respect to the particular steering torque even at the same vehicle speed, so that it is structured such that the oil pressure for obtaining the steering assist force having an optimum magnitude at the vehicle speed is generated in the operating chamber in the power cylinder mechanism.

Since the steering assist force with respect to the steering torque at each of the vehicle speeds can be set to various magnitudes by suitably changing the set valve opening degree of the assist control valve with respect to the fluid pressure of the first flow passage obtained by reflecting the external load at the steering torque, the freedom for setting the steering assist force with respect to steering torque at the vehicle speed becomes great, so that it is possible to set steering assist force to an optimum magnitude at each of the vehicle speeds.

Since the portion which controls the flow amount of the first and second valve portions in the main control valve may be formed in accordance with the working to such a degree that the steering torque can be reflected to the first flow passage, it is not required to work at a high accuracy and it is possible to reduce cost.

Since it is possible to set the steering assist force with respect to each of the steering torque by changing the set valve opening degree of the assist control valve with respect to the fluid pressure obtained by reflecting the external load to the steering torque, it is possible to easily change the setting of the steering assist force with respect to each of the steering torque in correspondence to the kind of vehicle and the driver's taste upon using the main control valve having the same structure. Due to the common use of the main control valve and since it is not required to change the portion for controlling the flow amount in the first and second valve portions in accordance with the working or the like, it is possible to reduce cost.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A hydraulic power steering apparatus for a vehicle comprising:

an input member interlocking with a steering wheel;

an output member connected to said input member so as to move relatively freely;

a steering mechanism steering a wheel in an interlocking relationship with said output member;

a main control valve having a first valve portion and a second valve portion in which a valve opening degree is controlled on the basis of a relative movement between said input member and said output member;

a power cylinder mechanism generating a steering assist force applied to said steering mechanism in correspondence to a fluid pressure in a working chamber in which a working fluid is supplied and discharged;

a first flow passage communicating a pump apparatus for discharging a fixed flow amount of working fluid with said main control valve;

a second flow passage branched from said first flow passage and communicated with a low pressure portion via an assist control valve and said main control valve;

a control unit controlling said assist control valve;

said first valve portion controlling a supply amount of the working fluid in said first flow passage to said working chamber; and said second valve portion controlling a discharge amount of the working fluid in said second flow passage to said low pressure portion in accordance with cooperation with said assist control valve, wherein a vehicle speed sensor for detecting a vehicle speed and a pressure sensor for detecting a fluid pressure of the working fluid in said first flow passage are provided, and said control unit controls a valve opening degree of said assist control valve to a set valve opening degree set on the basis of the vehicle speed detected by said vehicle speed sensor and the fluid pressure detected by said pressure sensor.

2. A hydraulic power steering apparatus for a vehicle as claimed in claim 1, wherein said control unit is arranged and constructed to set the valve opening degree of said assist control valve to a fully closed side at a time of a vehicle speed equal to or less than a predetermined low vehicle speed including a vehicle stop time, and is arranged and constructed to set the valve opening degree so as to be increased in accordance with an increase of the vehicle speed from the predetermined low vehicle speed, in connection with the vehicle speed detected by the vehicle speed sensor, and is arranged and constructed to set the valve opening degree so that the fluid pressure by which the steering assist force having an optimum magnitude is generated is generated in the power cylinder mechanism, with respect to the steering torque generated at a time when the driver operates the steering wheel at a certain vehicle speed, in connection with the fluid pressure detected by the pressure sensor.

* * * * *